(12) United States Patent
Locker et al.

(10) Patent No.: US 8,646,068 B2
(45) Date of Patent: Feb. 4, 2014

(54) HOME IMAGE CONTENT SECURELY ISOLATED FROM CORPORATE IT

(75) Inventors: Howard Locker, Cary, NC (US); Rod D. Waltermann, Rougemont, NC (US); Richard Wayne Cheston, Morrisville, NC (US); Song Chunyu, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1090 days.

(21) Appl. No.: 12/578,462

(22) Filed: Oct. 13, 2009

(65) Prior Publication Data

US 2011/0088082 A1    Apr. 14, 2011

(51) Int. Cl.
   *H04L 29/06*    (2006.01)
   *G06F 21/00*    (2013.01)
(52) U.S. Cl.
   USPC ............................ 726/16; 713/164; 713/189
(58) Field of Classification Search
   None
   See application file for complete search history.

(56) References Cited

U.S. PATENT DOCUMENTS

| 5,745,748 | A  | * | 4/1998  | Ahmad et al. ............... 709/217 |
| 2004/0268135 | A1 | * | 12/2004 | Zimmer et al. .............. 713/189 |
| 2006/0184794 | A1 | * | 8/2006  | Desselle et al. ............. 713/166 |
| 2008/0320312 | A1 | * | 12/2008 | Duffus et al. ................ 713/189 |
| 2010/0146251 | A1 | * | 6/2010  | Lo et al. ........................... 713/1 |

\* cited by examiner

*Primary Examiner* — Gilberto Barron, Jr.
*Assistant Examiner* — Malcolm Cribbs
(74) *Attorney, Agent, or Firm* — Brian J. Pangrle

(57) ABSTRACT

An exemplary apparatus includes one or more processors, volatile memory, a storage drive and circuitry configured to establish a network connection and to attempt to send credentials via an established network connection. Such an apparatus further includes circuitry configured, responsive to authentication failure after an attempt to send credentials, to release an implemented security policy and load an operating system stored on the storage drive, and, responsive to an attempt to send credentials, to maintain an implemented security policy and to use an operating system exposed via an established network connection and associated with the sent credentials Such an apparatus optionally includes circuitry configured to implement a security policy that isolates at least a portion of a local storage drive. Various other apparatuses, systems, methods, etc., are also disclosed.

18 Claims, 8 Drawing Sheets

HOME IMAGE CONTENT SECURELY ISOLATED FROM CORPORATE IT

TECHNICAL FIELD

Subject matter disclosed herein generally relates to using an operating system from a local storage or using an operating system exposed via a network in conjunction with a security policy.

BACKGROUND

One of the key problems facing information technology today stems from people using their business computers for personal endeavors or using their personal computers for business endeavors. Such mixed use of computers can corrupt a business image of an operating system by introducing errors, viruses, etc. While virtualization can solve such an issue by running an independent business image of an operating system and an independent personal image of an operating system, without either one bleeding into the other, other issues arise. For example, the personal image can have information that could cause the business to have legal exposure and vice versa. Various exemplary methods, apparatuses, systems, etc., described herein aim to reduce certain types of risk that arise from mixed use computing.

SUMMARY

An exemplary apparatus includes one or more processors, volatile memory, a storage drive and circuitry configured to establish a network connection and to attempt to send credentials via an established network connection. Such an apparatus further includes circuitry configured, responsive to authentication failure after an attempt to send credentials, to release an implemented security policy and load an operating system stored on the storage drive, and, responsive to an attempt to send credentials, to maintain an implemented security policy and to use an operating system exposed via an established network connection and associated with the sent credentials. Such an apparatus optionally includes circuitry configured to implement a security policy that isolates at least a portion of a local storage drive. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
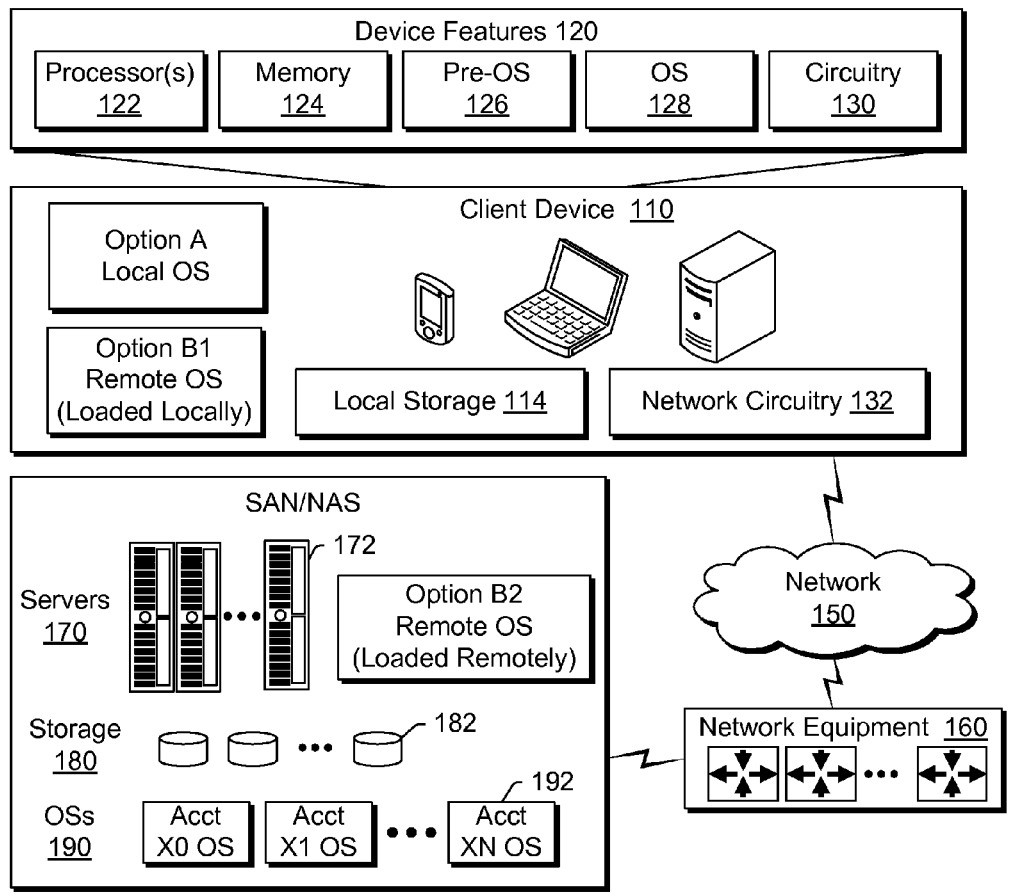
FIG. 1 is a diagram of an exemplary system for using a locally stored operating system or using an operating system exposed via a network connection.
Figure 1:
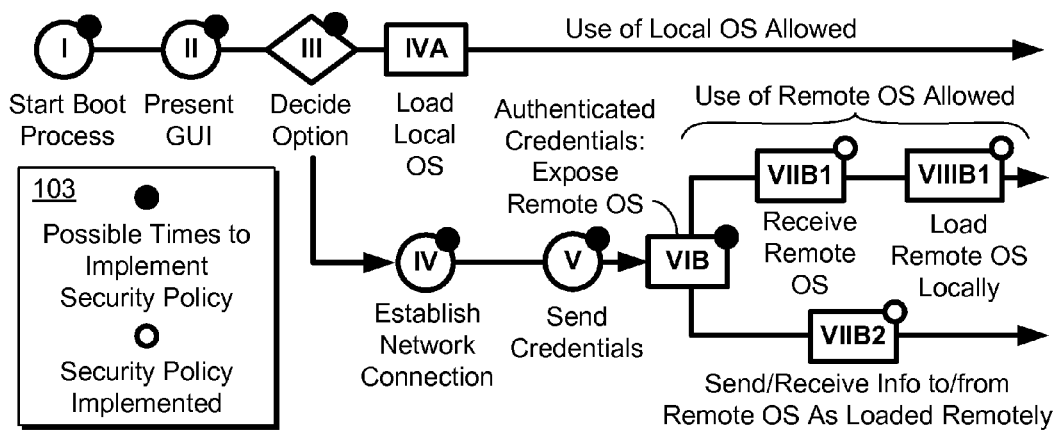

FIG. 1 shows an exemplary system 100 configured to implement at least two options related to a client device 110. In the example of FIG. 1, Option A allows the client device 110 to use a local operating system (OS) while Options B1 and B2 allow the client device to use a remote operating system exposed via a network connection. Specifically, Option B1 allows the client device to load a remote OS and Option B2 allows the client device to use a remote OS. As described herein, Option B1 involves receipt and loading of at least a portion of an OS exposed via a network connection. While various examples mention an OS, information such as applications and data may be exposed via a network connection and received and loaded or used in either of Options B1 and B2. An exemplary client device timeline 101 demonstrates how Options A, B1 or B2 may occur with respect to time.

As shown, the client device 110 includes local storage 114 and network circuitry 132 as well as device features 120. The device features 120 include one or more processors 122, memory 124, pre-operating system instructions 126, a stored local OS 128 and other circuitry 130. As described herein, Option A allows the client device 110 to load and use the local operating system 128 from the local storage 114, Option B1 allows the client device to load and use a remote OS received via the network circuitry 132 and Option B2 allows the client to use a remote OS by sending and receiving information via the network circuitry. As described herein, Options B1 and B2 both allow for use of an operating system exposed via a network connection.

Regarding Option B1, the client device 110 is configured to establish a connection to a network 150 to receive an OS exposed via the network 150. The network 150 may be the Internet, an Intranet, a local area network (LAN), a wide area network (WAN) or other network. In the example of FIG. 1, network equipment 160 and servers 170 are accessible via the network 150. For example, the network equipment 160 may include one or more routers that route network communications to one or more of the servers 170. While this example refers to routers, the network equipment 160 may include any of a variety of network equipment such as load balancers, intermediate servers, firewalls, etc. As shown in FIG. 1, the servers 170 can access storage 180, which stores operating systems 190 and optionally other information (e.g., consider a SAN, a NAS or other storage architecture).

Regarding Option B2, the client device 110 does not receive an OS via the network 150 but rather uses a remote OS exposed via the network 150 and running on another device, for example, by sending and receiving information via the network 150. As shown in FIG. 1, the servers 170 can load one or more of the OSs 190 for use by the client device 110.

In the example of FIG. 1, the OSs 190 are associated with accounts (e.g., X0, X1, . . . , XN). To associate a user of the client device 110 with a particular account OS, the client device 100 sends identifying information, which may be a credential or credentials. For example, identification credentials can be a user name and a password. Other examples of credentials include cryptography credentials such as a machine-readable cryptographic key. Such a key may be self-issued or issued by an authentication party, which may be a trusted third party. Various types of cryptographic credentials are designed to expire according to one or more criteria (e.g., time, number of uses, etc.). As described herein, credentials may be biometric. In the system 100 of FIG. 1, an authentication server may perform authentication (e.g., to establish a network connection) while another server accesses an OS associated with an account. After authentication, a server may send information of where an OS associated with the credentials is located (e.g., thereby exposing the OS). With the location known, the client device 110 may download the remote OS (Option B1) or directly connect to the remote OS as loaded on a remote device (Option B2). As described herein, a remote OS may be stored in a SAN configured to execute remote OSs for use by client devices. As mentioned, according to Option B1, parts or all of an OS can be cached in a client device. Such an approach can allow for improved performance compared to Option B2.

With respect to Option A and Options B1 and B2, Option A may be a selected option or a default option, for example, where the client device 110 fails to establish a network connection or fails to receive an authentication notice for sent credentials. Option A may also be a default option due to a policy or where a problem exists in the system 100 such as a faulty piece of network equipment, network service, server service, traffic overload, etc. With respect to selecting an option, the client device 110 may be configured to present a graphic user interface (GUI) that includes a user selectable control to choose Option A or a remote OS per Option B1 or Option B2. According to the example of FIG. 1, Options B1 and B2 require a viable network connection and Option B1 further includes successful receipt of an OS via the network 150. As mentioned, Options B1 and B2 require some identifying information (e.g., credentials) and authentication of such information before an OS can be exposed via the network 150.

As described herein, Options B1 and B2 can rely on an infrastructure system associated with a corporation. For example, an employee of the corporation has a corporate office that houses a computer with a network connection to a LAN that provides for access to a storage area network (SAN) (e.g., via the iSCSI protocol) that stores OSs associated with various employees. On an ordinary work day, the employee enters her credentials into a graphical user interface (GUI) as displayed on a monitor of the computer. The computer sends the credentials via the LAN for authentication. Upon authentication of the sent credentials, the OS is exposed and the computer can receive the OS as stored on the SAN or otherwise use the OS. Where the computer receives the OS, a boot process loads the OS into memory and the computer becomes operational for particular tasks associated with the employee's work duties. In this example, as the employee performs the tasks, information may be transmitted via the LAN to the SAN for storage in association with the employee's account. In such a manner, the computer operates largely as a sophisticated terminal where its OS and data are stored remotely and for use and access on a daily or an as needed basis.

In the foregoing example, consider a day where the employee decides to work from home using her own personal computer, which may be a notebook or other type of computer. Given the exemplary system 100 of FIG. 1, where the employee's computer is the client device 110, the client device 110 can access the corporation's SAN (or NAS, etc.) via the network 150 (e.g., by establishing a virtual private network through the Internet). Upon submission and authentication of credentials, the SAN can expose the employee's OS for download or remote use and optionally provide access to the employee's associated data. In such a manner, the employee can work at home (or other remote location) using her own computer and have an experience quite similar to working on her work computer. As mentioned, a remote OS may be configured and exposed for download or remote use in conjunction data and one or more applications.

The foregoing remote scenario does have associated risks as the computer is a mixed use computer, i.e., it is not used solely for the employee's job. In a scenario involving a consultant, the situation may be even more problematic as a computer of the consultant may be used to store information belonging to multiple corporate clients.

As described herein, various types of risk can be presented by storage of corporate information on a mixed use computer and by storage of a user's personal or other information on a mixed use computer. For example, regarding the latter, instances have played out where actions by a user (e.g., Internet fraud, SPAM, home business, personal attacks, trafficking illegal images, etc.) have prompted criminal investigations as to content stored on the user's mixed use computer. Such investigations can expose sensitive corporate information and even lead to accusations of corporate liability (e.g., vicarious liability). In such situations, a corporation may be required to respond to both legal and public relations issues stemming from the fact that some sensitive corporate information existed on a user's home computer or that corporate resources were involved in enabling or furthering the user's actions. According to the exemplary system 100, where a client device can only function as a smart terminal for corporate use, the corporation can present such facts to manage risk as well as accusations.

Other types of risk are more directly or even solely related to a corporation and arise from its data being stored on a mixed use computer. Such risks include regulatory risks and conventional legal risks, for example, litigation discovery risks. Regulatory risks exist for export of sensitive data or information (e.g., export controls). For an employee working for a national defense contractor, law or policy can forbid transport or transmission of data to certain nations. Litigation in the United States is discovery intensive. Requests for production of electronic data are commonplace. Thus, where an employee stores work-related data on her own personal computer, that computer may be subject to discovery. The logistics of so-called "e-discovery" and penalties for failure to comply with proper discovery requests present, to most corporations, significant costs. As described herein, the exemplary system 100 can optionally implement one or more policies that can reduce one or more of the aforementioned risks or other risks. For example, a particular security policy calls for isolating at least a portion of a local storage drive of a client device (e.g., including completely disabling a local storage drive). In the foregoing scenarios, upon implementation of such a security policy, isolation prevents corporate data from being stored to at least a portion of that local storage drive. Consequently, in response to an e-discovery request, a lawyer for the corporation may consider at least that portion of the local storage drive free of corporate data and not subject to search. As described herein, by disabling a local storage drive, intermixing of information can be prevented when using a remote OS.

As described herein, the exemplary client device or apparatus 110 includes the one or more processors 122, the memory 124, the local storage 114 (e.g., consider a local storage drive such as a SSD, a HDD, etc.) and circuitry (e.g., device features 120, including the network circuitry 132) configured to implement a security policy that isolates at least a portion or all of the local storage 114, establish a network connection, to attempt to send credentials via an established network connection, responsive to authentication failure after an attempt to send credentials, to release an implemented security policy and allow use of the OS 128 stored on the local storage 114, and responsive to an attempt to send credentials, to maintain an implemented security policy and allow use of a remote OS (e.g., OS 192) exposed via the network connection and related to sent credentials.

In FIG. 1, the timeline 101 illustrates some possible paths for implementing Option A, Option B1 and Option B2 where various actions (labeled with Roman numerals) are presented as occurring on a client device such as the client device 110. The actions are shown along with filled and open circles that pertain to a security policy 103 where filled circles represent possible times to implement a security policy and open circles represent times where a security policy is in place (i.e., implemented).

According to the timeline 101, at time I, a client device starts a boot process. At time II, the client device presents a GUI. At time III, the client device receives input via the GUI sufficient to make a decision as to whether to proceed with Option A or one of the Options B1 or B2.

If the client device decides to proceed with Option A, then at time IVA, the client device loads a local OS and use of the local OS is allowed (e.g., according to local configuration instructions). However, if the client device decides to proceed with one of the Options B1 or B2, at time IV, the client device establishes a network connection (e.g., via network circuitry 132). At time V, the client device sends credentials via the established network connection, for example, where the sent credentials may be credentials entered via the GUI presented at time II.

As shown in the example of FIG. 1, upon authentication of the sent credentials, at time IVB, the remote OS is exposed to the client device via the established network connection. At this time, the client device allows for use of a remote OS, for example, according to instructions that may further call for implementation of a security policy. With respect to authentication, such a process typically occurs, at least in part, remotely. Such a process may transmit an authentication notice to the client device via the established network connection. Hence, a client device may receive, via the established connection, an authentication notice that triggers one or more instructions that configure the client device for use of a remote OS (e.g., as exposed via the network connection). In an instance where authentication does not occur (e.g., an authentication notice is not received by the client device), instructions may cause the client device to automatically proceed to Option A or, alternatively, to present authentication failure notice information via the GUI (or another GUI). Other types of failures (e.g., network, remote OS not found, etc.) may also cause the client device to proceed to Option A (e.g., upon a time out, etc.).

According to Option B1, at time VIIB1, the client device receives the remote OS and, at time VIIIB1, the client device loads the remote OS locally. According to Option B2, at time VIIB2, the client device sends and receives information via the established network connection to use the remote OS, as loaded remotely.

Referring to the open circles, if Option B1 or Option B2 occurs, the security policy is implemented (e.g., the client device may execute an instruction that prevents recognition of its local storage drive or otherwise disables its local storage drive). A security policy may differ for Option B1 and Option B2. For example, for Option B1, a security policy may disable a portion of a local storage drive that stores a local OS (or local OS image) while, for Option B2, a security policy may disable an entire local storage drive. Of course, these two policies may be part of a comprehensive security policy that accounts for various options (e.g., Option B1 and B2).

As described with reference to the exemplary timeline 101, if a security policy that affects a storage location for a local OS is implemented at, or prior to, time III, then that policy is released where a decision is made to proceed with Option A (e.g., to allow for loading of the local OS from that storage location). In contrast, if a decision is made to proceed with Option B1 or B2, the security policy is maintained; noting that a failure to expose or allow for use of a remote OS may revert to Option A and release of the security policy. By maintaining a security policy for Options B1 and B2, such an exemplary method aims reduce, or eliminate, the risk of a client device corrupting, infecting, etc., a remote OS. For example, if the local OS is prevented from loading, it cannot interfere with the remote OS. Such an approach can avoid intermixing of information (e.g., data, instructions, etc.) where the client device is used for personal tasks (e.g., home OS, apps, data, etc.) and work tasks (e.g., corporate OS, apps, data, etc.).

Figure 2:
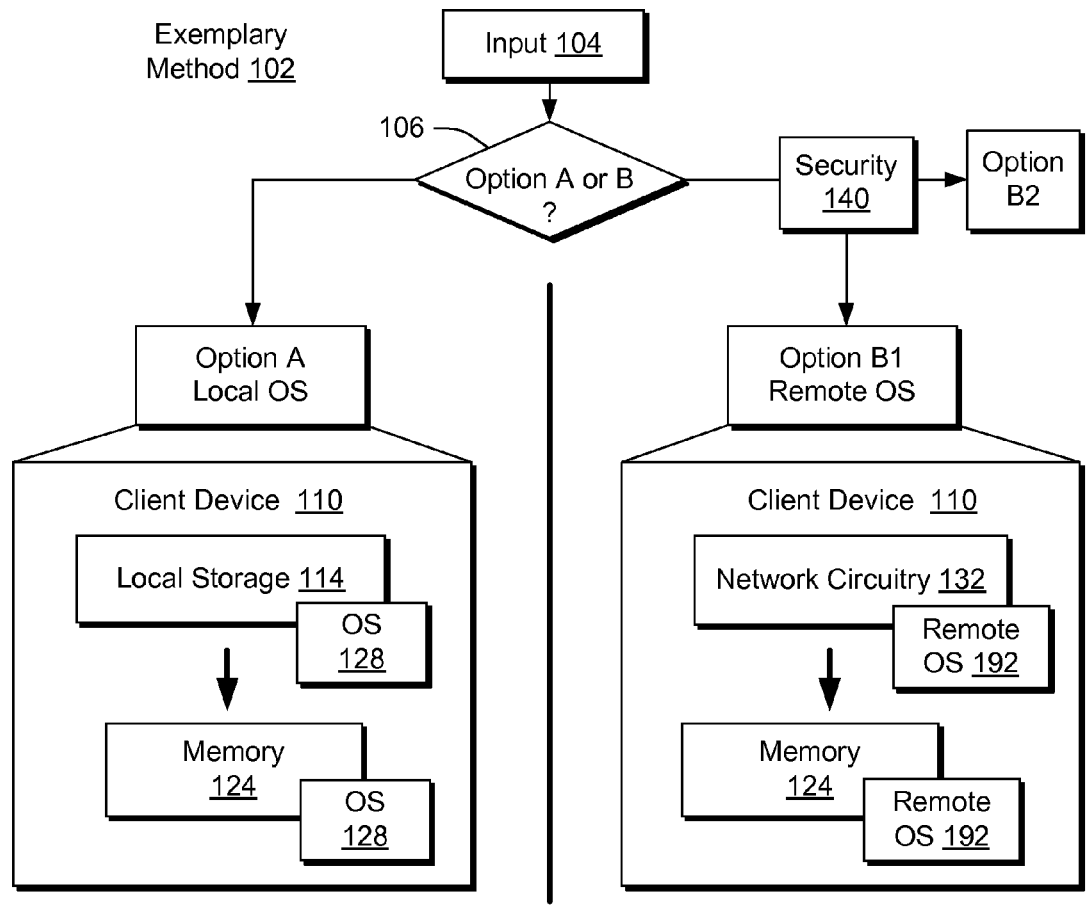
FIG. 2 is a diagram of an exemplary method that decides whether to allow use of a locally stored operating system or an operating system exposed via a network connection.
Figure 2:
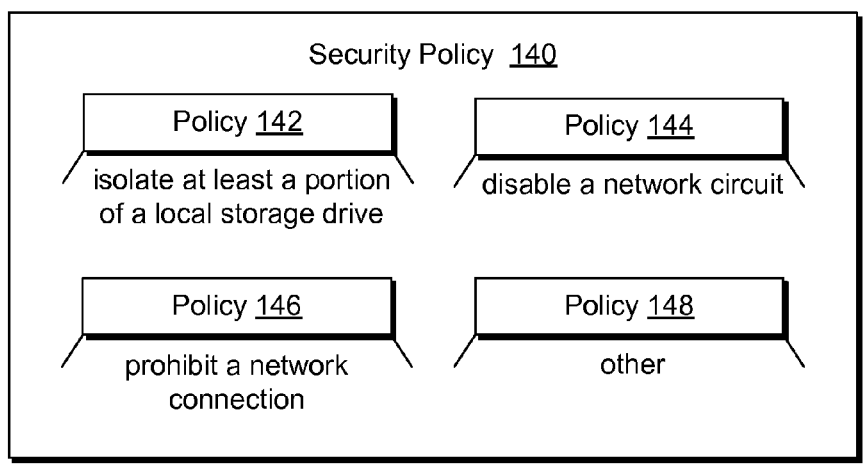

FIG. 2 shows an exemplary method 102 for deciding whether Option A or Option B (e.g., B1 or B2) is appropriate. The method 102 commences in an input block 104 that proceeds to a decision block 106 that relies on decision logic to decide whether the method 102 should be directed to Option A or Option B. As explained with respect to the system 100 of FIG. 1, Option A involves a client device 110 where an OS 128 stored in a local storage 114 is loaded into the memory 124 while for Option B, the client device 110 relies on a remote OS 192 exposed via a network connection.

If the decision block 106 decides to proceed with Option B, a security policy is implemented per the security block 140. For example, Option B may implement one or more policies such as a local storage isolation policy 142 (e.g., by disabling all local storage drives), a network circuit disablement policy 144, a network connection prohibition policy 146, or other policy 148.

As to the network circuitry disablement policy 144, such a policy may disable certain network circuitry of a client device to prevent transmission of an OS or data received via a network (e.g., from a corporate SAN). As to the network connection prohibition policy 146, such a policy may allow a client device to have only a single network connection, for example, to a corporate SAN.

Once a security policy has been implemented, according to Option B1 the client device receives the remote OS 192 via network circuitry 132 and loads it into the memory 124.

With respect to the input block 104, a client device may present a GUI to a user for input of credentials. The actual instructions to render the GUI may be stored locally and retrieved for execution during commencement of a boot process to load an OS. Instructions to render a GUI may be stored remotely and received after establishing an initial, unsecured network connection (e.g., consider upon accessing a website), stored partially locally and partially remotely, etc.

Figure 3:
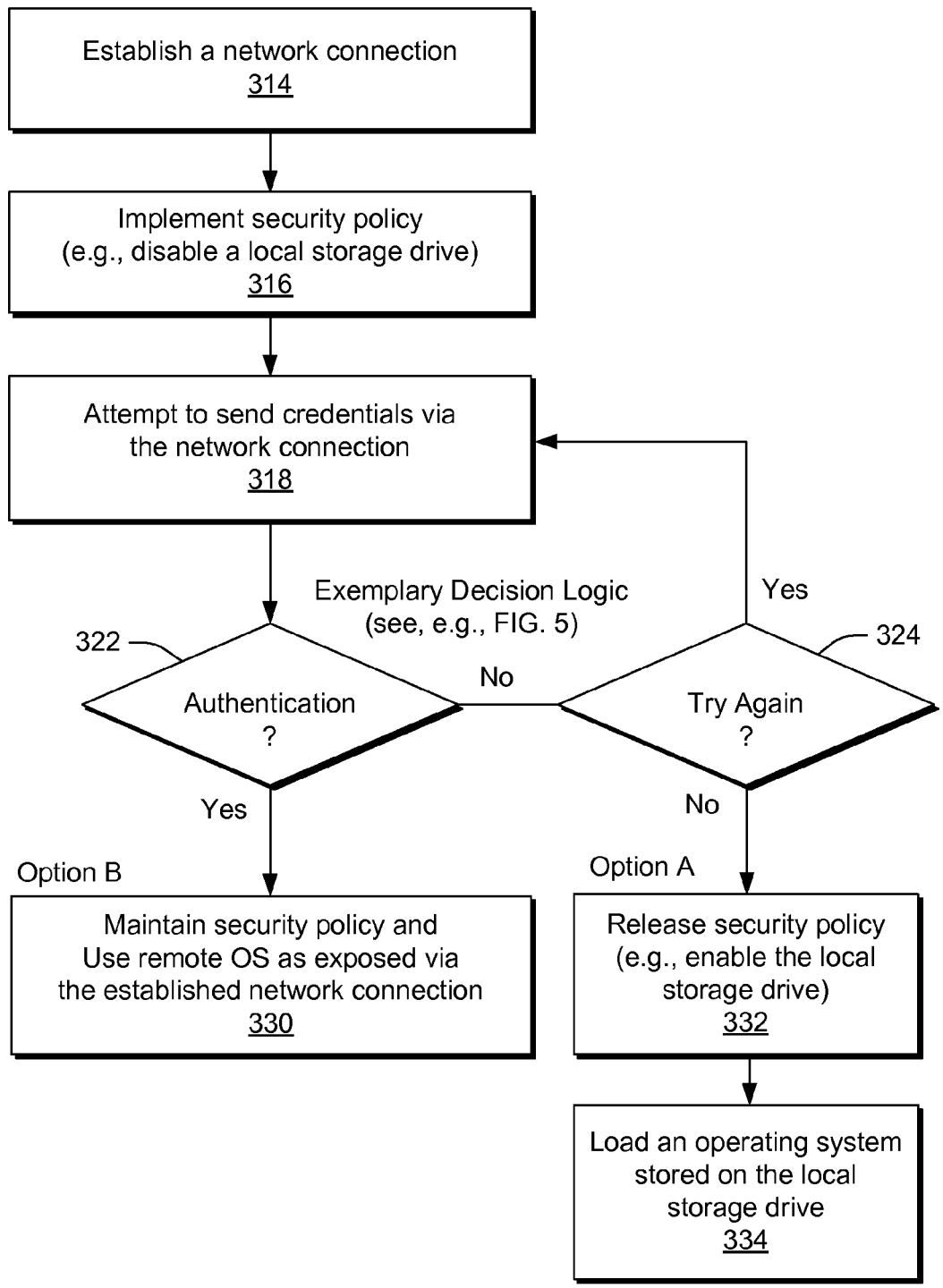
FIG. 3 is a diagram of an exemplary method that decides whether to allow use of a locally stored operating system or an operating system exposed via a network connection.

FIG. 3 shows an exemplary method 300 for deciding whether to use a local OS or to implement a security policy and use a remote OS exposed via a network connection. The method 300 commences in an establishment block 314 that establishes a network connection. Upon establishment of the network connection, an implementation block 316 implements a security policy (e.g., to disable a local storage drive). After implementation of the security policy, an attempt block 318 attempts to send credentials via the established network connection. For example, the establishment block 314 may access a website that presents a GUI with fields for input of credentials. Upon entry of the credentials and a send command, the method 300 has attempted to send the credentials via the established network connection.

As shown in FIG. 3, the exemplary method 300 continues at a decision block 322. The decision block 322 operates based on decision logic (see, e.g., exemplary decision logic of FIG. 5). Specifically, the decision block 322 operates based on authentication logic that decides whether the sent credentials can be authenticated. If the sent credentials can be authenticated, the method 300 continues to a use block 330 that uses an OS related to the sent credentials where the OS is received via the network connection (Option B1) or used via the network connection (Option B2). As indicated in FIG. 3, if the decision block 322 fails to authenticate the credentials, then the method 300 continues at another decision block 324, which may automatically present a GUI for re-entry of credentials or other information and continue at the attempt block 318. If another attempt is not warranted for any of a variety of reasons (e.g., credentials do not meet some minimum requirement, the remote OS is not available, etc.), the method 300 continues at a load block 334 that loads an operating system stored on a local storage drive.

As explained herein, the method 300 can reduce risks associated with employees, contractors, etc., by preventing storage of an organization's data on a client device.

Figure 4:
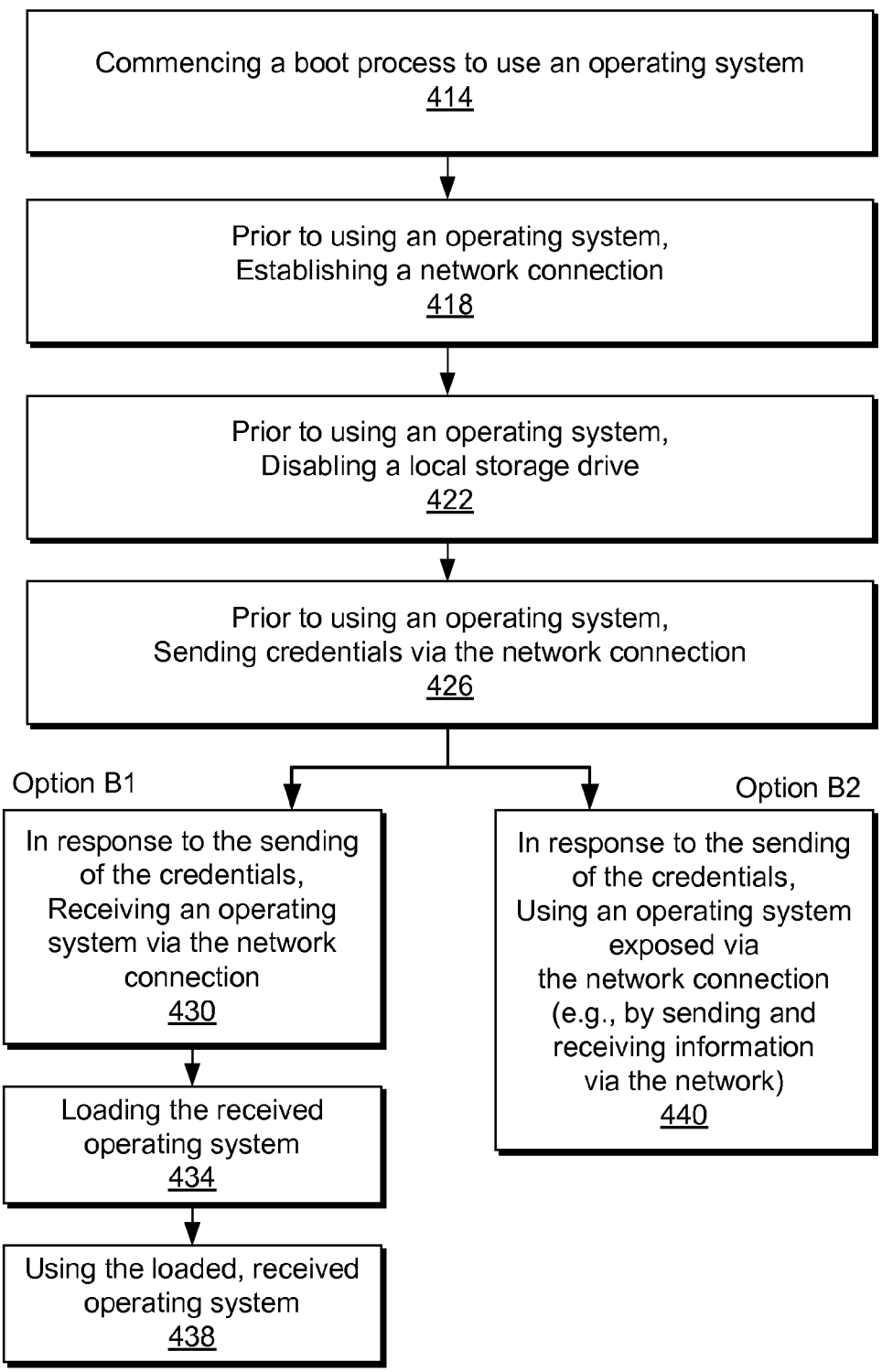
FIG. 4 is a diagram of an exemplary method that implements a security policy and that allows use of an operating system exposed via a network connection.

FIG. 4 shows an exemplary method 400 that is generally related to Option B of FIG. 1. The method 400 includes a step 414 of commencing a boot process to use an OS; a step 418 of, prior to using an OS, establishing a network connection; a step 422 of, prior to using an OS, disabling a local storage drive; and a step 426 of, prior to using an OS, sending credentials via the network connection. As indicated in the example of FIG. 4, for Option B1, step 430 includes receiving an OS via the network connection followed by a step 434 of loading the received OS and a step 438 of using the received and loaded OS. For Option B2, in response to the sending of credentials, a step 440 includes using an operating system, for example, by sending and receiving information via the established network connection. In instances where a portion of a remote OS (e.g., remote OS image) is stored locally in local memory (e.g., to improve performance), upon completion of a session, the local memory may be flushed to enhance security. Such a process may be part of a security policy. Accordingly, a security policy may instruct a client device to take actions prior to use of a remote OS, during use of a remote OS and after use of a remote OS.

As mentioned, using a remote OS and implementing a security policy may occur in any of a variety of orders, including substantially simultaneously. A particular approach implements a security policy as soon as a client device receives any input that requests use of a remote OS (e.g., whether for download via a network and local use or for use remotely via a network). For example, logically, this may be represented as "upon receipt of a request to use a remote OS, implement a security policy". Such a request may be entry of credentials (e.g., name/password, key location, fingerprint, etc.), a request to send credentials or selection of a control (e.g., GUI control, keyboard stroke, etc.).

As an alternative, upon receipt of an OS via a network, circuitry of a client device may determine that the received OS is going to be loaded. Responsive to such a determination, the client device may implement a security policy. Logically, this may be represented as: "if a remote OS has been received, implement security policy Z". In yet another alternative approach, the received OS may trigger implementation of a security policy after it has been loaded. Logically, this may be represented as: "received OS loaded, instruct client device to implement security policy Y". In such an example, the security policy information may be part of the received OS. In an alternative example, the security policy information may be data received and associated with the OS (e.g., in a single file or multiple files).

Figure 5:
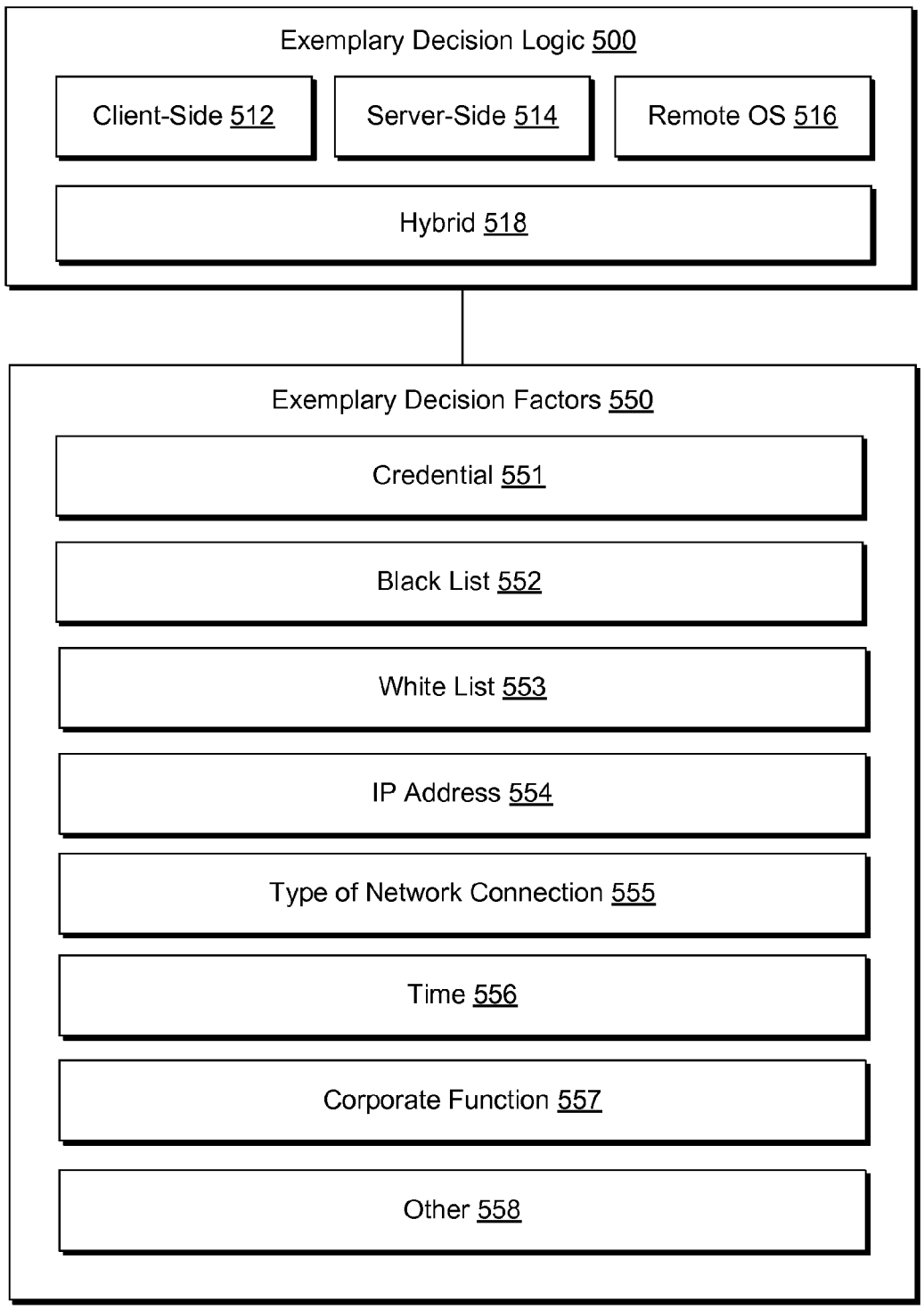
FIG. 5 is a diagram of exemplary decision logic and exemplary decision factors.

FIG. 5 shows exemplary decision logic 500 and exemplary decision factors 550 that may be relied upon in deciding whether to load a remote OS or a local OS and optionally whether (or what type of) a security policy should be implemented if a remote OS has been received (or loaded). As indicated in FIG. 5, the decision logic may reside on a client-side 512, a server-side 514 or in association with a remote OS 516. A hybrid 518 refers to combinations of the foregoing, for example, where part of the decision logic resides initially on a client-side 512, a server-side 514 or as associated with a remote OS 516.

The decision factors 550 include credentials 551, a black list 552, a white list 553, IP address 554, type of network connection 555, time 556, corporate function 557 and other 558. As mentioned, one or more of these factors may be relied upon when deciding whether to use, send or load a remote OS, whether to implement a security policy, what type of security policy to implement or whether to load a local OS.

For example, the black list 552 may include a list of conditions, which, if present, would prevent transmission of an OS via a network to a client device or loading an OS remotely for use via a network. In contrast, the white list 553 may include a list of conditions, which, if present, approve transmission of an OS via a network to a client device or use of a remotely loaded OS via a network.

With respect to IP address 554, as a factor, if an IP address indicates that a client device is in a particular foreign region or country, this may cause decision logic to prohibit transmission of an OS via a network to a client device or use of a remotely loaded OS via a network. IP address may be a factor when deciding whether to implement a security policy or deciding what type of security policy to implement. For example, if a client device has an IP address for a friendly country (e.g., based on laws), then a security policy may allow one or more additional network connections (e.g., to certain IP addresses). However, if a client device has an IP address for a hostile country (e.g., based on laws), then a security policy may prohibit the client device from having more than one network connection.

With respect to type of network connection 555, if a client device establishes a VPN, this may enter into a decision making process and provide for a more lenient security policy than a conventional Internet connection.

With respect to time 556, as mentioned, a client device or account may be locked out for certain times, which may be coordinate with global time zones. Time may also be a factor to terminate a network connection. For example, upon expiration of a time period, a network connection may be terminated. Where a remote OS loaded on a client device requires periodic communication with a resource exposed via the now terminate network connection, the remote OS loaded on the client device may respond to a failure to communicate by instructing the client device to power down (e.g., to release the remote OS from its memory).

With respect to corporate function 557, where an account is associated with a corporate attorney, decision logic may forego implementation of a security policy or call for implementation of a security policy that accounts for particular risks to be managed by the corporate attorney. For example, a corporate attorney investigating particular issues may be allowed to install OSs from multiple accounts (e.g., as part of a HR or other investigation). Depending on the nature of the client device, such a user may be able to load multiple remote OSs on the client device and switch between them for comparative or other purposes.

As described herein, an exemplary method can include establishing a network connection where information related to the network connection can be optionally relied upon in decision making (e.g., authentication, policy, etc.). Such information can include, for example, information related to an operating system received or used via the network connection, information related to the credentials for establishing the network connection, information related to the type of network connection, one or more IP addresses of the network connection, a time related to the network connection, a command received via the network connection, a security policy received via the network connection, and information related to one or more types of hardware exposed via the network connection (e.g., type of server, type of client device, etc.).

Figure 6:
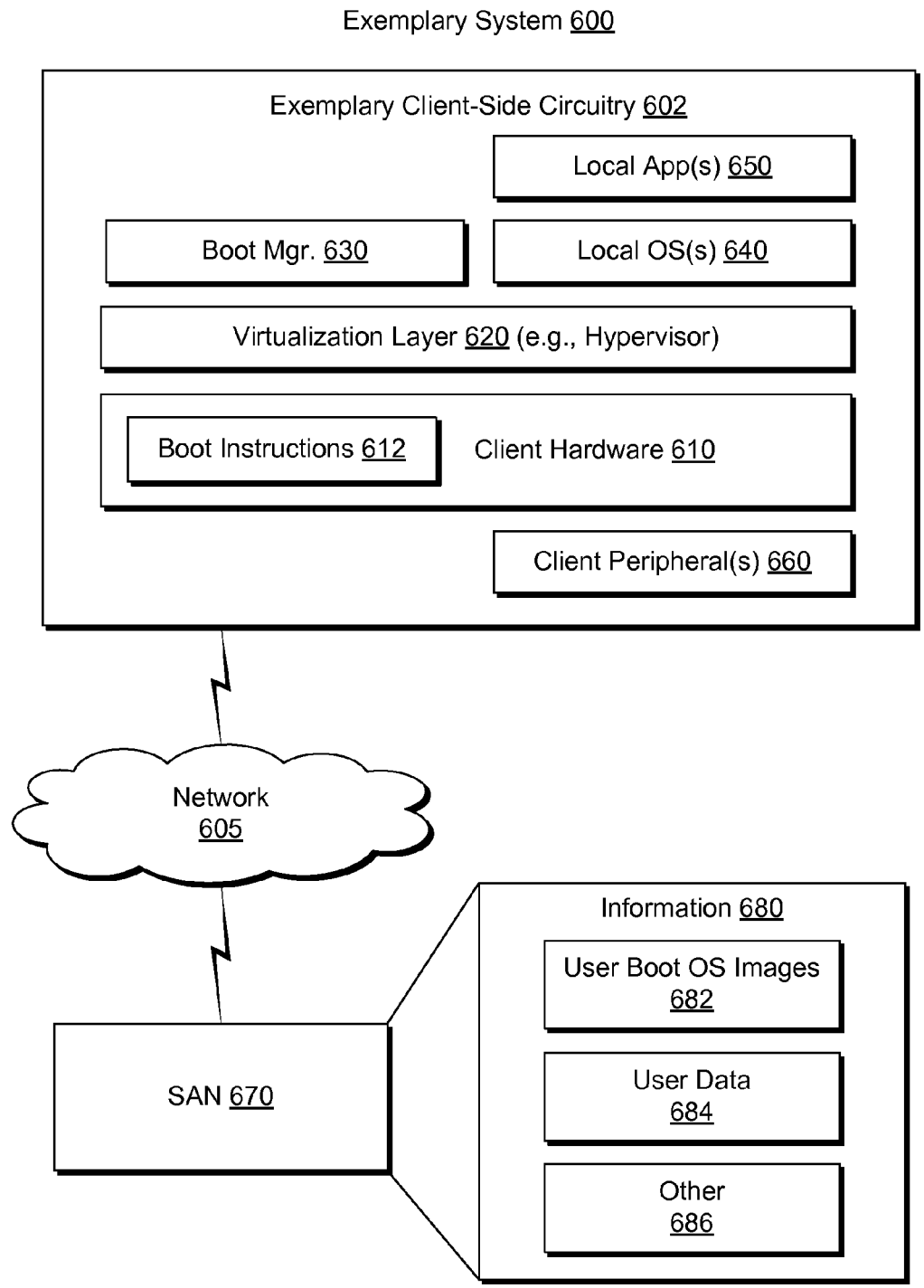
FIG. 6 is a diagram of an exemplary system configured to allow use of an operating system exposed via a network connection.

FIG. 6 shows an exemplary system 600 that includes exemplary client-side circuitry 602. In the example of FIG. 6, the client-side circuitry 602 includes client hardware 610, boot instructions 612, a virtualization layer 620, a boot manager 630, one or more local OSs 640, one or more local applications 650 and one or more client peripherals 660.

Various components of FIG. 6 are described with respect to the iSCSI protocol for loading a remote OS. In such an example, the boot instructions 612 can be stored as iSCSI boot firmware (e.g., iBF) on the client hardware 610 and the boot manager 630 can include features of an iSCSI controller. Upon commencement of a boot process to load an OS, the virtualization layer 620 can coordinate execution of the boot instructions 612 and execution of the boot manager 630. Such a process can include aspects of a so-called "boot over network" process.

Authentication may occur in a network connection using the iSCSI or other protocol by any of a variety of techniques. Various levels of security exist for SAN connections. For example, consider a basic level based on the Challenge Handshake Authentication Protocol (CHAP) and a more advanced level based on IP security (IPsec) that enforces authentication and data encryption at the IP packet layer. Such authentication techniques may be part of decision logic that decides whether to load an OS received via a network connection.

With respect to the virtualization or abstraction layer 620, this layer may include features of the XEN® hypervisor (XENSOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default.

As described herein, an exemplary method proceeds, upon a condition precedent, by loading a remote OS instead of the highest priority local OS (or only local OS). Such a method may be implemented by a specialized virtualization layer configured to implement decision logic that causes loading of an OS received via a network connection (e.g., Option B1) or loading of a local OS (e.g., Option A).

In an alternative approach, an exemplary method may execute instructions to load a remote OS without loading a local OS and without reliance on a virtualization layer. For example, the boot instructions 612 may include a specialized set of instructions to implement decision logic to decide whether a client device should proceed via aforementioned Option A (local OS) or Option B1 (remote OS loaded locally) or Option B2 (remote OS loaded remotely). While the instructions 612 are shown as being part of the client hardware 610, part or all of such instructions may be associated with one or more client peripheral device 660. For example, a network card may be considered a peripheral device and include option ROM that provides instructions to implement decision logic.

As described herein, the boot instructions 612 may be provided as part of BIOS instructions (or simply BIOS) or they may be provided as part of an "Extensible Firmware Interface" (EFI). In conventional client devices, EFI is a specification that defines a software interface between an operating system and platform firmware. As described herein, exemplary BIOS instructions or exemplary EFI instructions can cause a client device to decide whether to use a remote OS (e.g., per Option B1 or Option B2) or a local OS (e.g., per Option A).

As described herein, an exemplary EFI boot manager operates as "an EFI application" that includes instructions to select and load an OS per aforementioned Option A or Option B1 or to use a remote OS per Option B2. For example, the EFI specification includes a shell that can be used to execute an EFI application. Such an application may optionally access and load data or extensions one or more non-volatile storage devices. Where a network connection has been established, an exemplary EFI application can optionally load data or an extension received via the network connection. An exemplary approach optionally includes providing an EFI partition on a SSD or HDD that adds specialized functionality to a standard EFI firmware (e.g., stored on a motherboard's ROM).

An exemplary GUI may be rendered on a display associated with a client device based in part on instructions provided according to the EFI specification, which supports graphical menus and associated features (e.g., according to the Universal Graphics Adapters (UGA) protocol or the Graphic Output Protocol (GOP)). Such a GUI may allow a user to enter credentials for retrieving a remote OS via a network connection. Further, a GUI may present one or more data fields with required information that may be germane to selection of a security policy to implement upon download of a remote OS (e.g., "enter country", "enter project code", "enter HR issue", etc.).

Referring again to the system 600 of FIG. 6, also shown are a network 605 and a SAN 670, which can provide information 680. The information 680 may include user boot OS images 682, user data 684 or other information 686.

Figure 7:
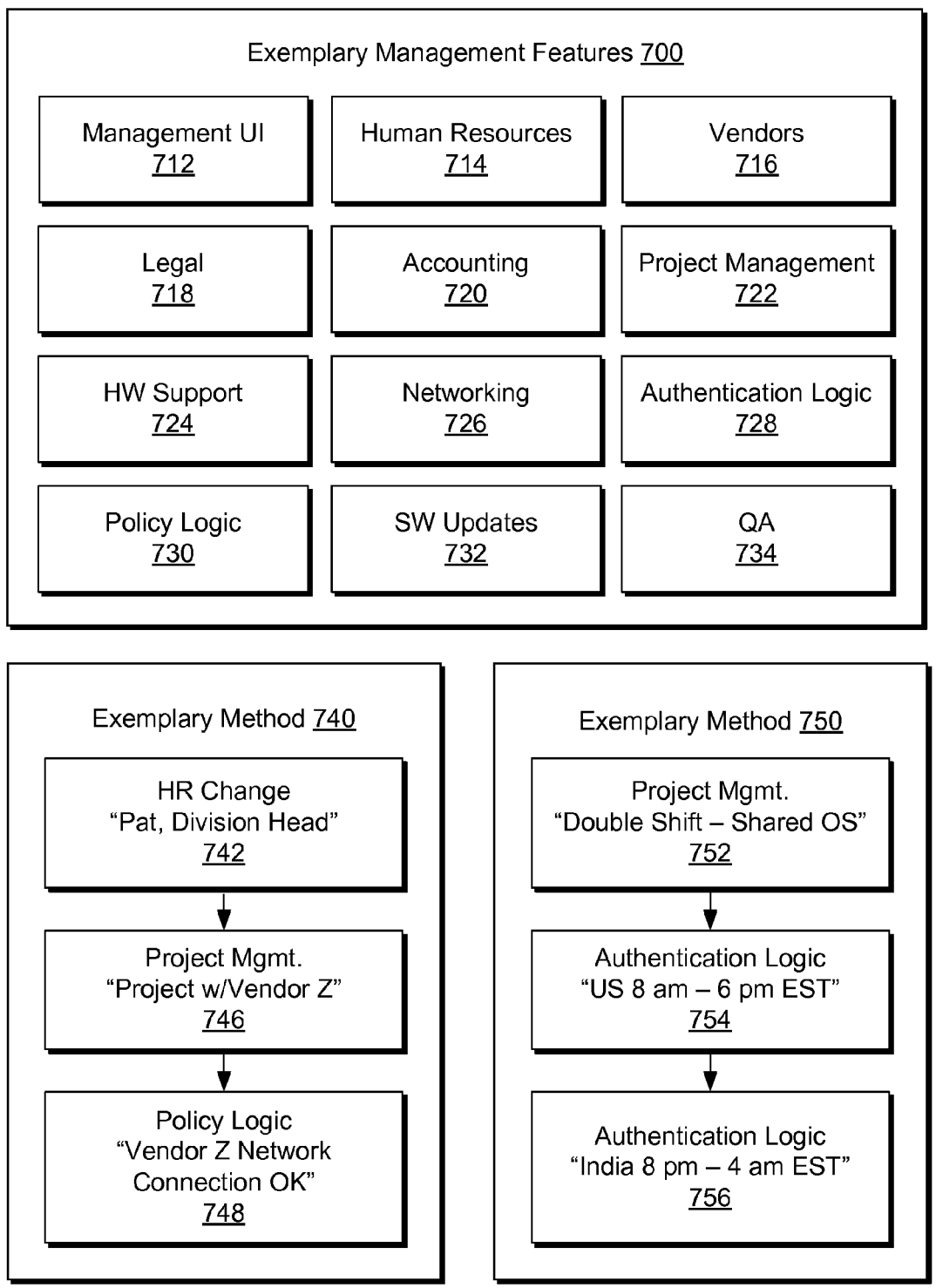
FIG. 7 is a diagram of exemplary management features for managing a system that provides access to operating systems and optionally policies to users via a network connection.

FIG. 7 shows various exemplary management features 700. Such features may be part of a management utility to manage decision logic, policies, etc. In the example of FIG. 7, the features 700 include a management UI 712, a human resources feature 714, a vendors feature 716, a legal feature 718, an accounting feature 720, a project management feature 722, a hardware support feature 724, a networking feature 726, an authentication logic feature 728, a policy logic feature 730, a software updates feature 732 and a quality assurance feature 734.

An exemplary method 740 relies on the human resources feature 714. In a change block 742, the management UI 712 may display a note "Pat, Division Head", indicating that Pat has a new title and role in the organization. In a project management block 746, the project management feature 722 relates Pat to a project with "Vendor Z". In response to this information, the method 740 determines policy logic (e.g., per the policy logic feature 730) to allow Pat's account to establish an additional network connection (given a remote OS scenario) to, for example, vendor Z's network.

An exemplary method 750 relies on the project management feature 722 to set policy. In this example, a project management block 752 notes that a so-called double shift has been assigned to a single OS. In other words, a single OS is to be shared by two individuals. The single OS is associated with two sets of credentials where one set is authorized for one period of time per authentication logic block 754 (worker in US) and for another, non-overlapping period of time per authentication logic block 756 (worker in India).

As described herein, an exemplary method includes commencing a boot process; and, prior to using an operating system, implementing a security policy by isolating at least a portion of a local storage drive, establishing a network connection, sending credentials via the network connection, and, in response to the sending of the credentials, maintaining the security policy and allowing use an operating system exposed via the established network connection and associated with the sent credentials or releasing the security policy and allowing use of an operating system stored on the local storage drive. In such a method, isolating can include disabling a local hard drive, disabling a local solid-state drive or disabling multiple drives. As mentioned, such a method may establish a network connection according to the iSCSI protocol.

As described herein, where an exemplary method includes loading an operating system received via a network connection, the method can include loading the operating system in volatile memory. For example, for purposes of security, upon termination of the network connection, power may be turned off to the volatile memory to release the stored operating system. Subsequently, a method can include commencing a boot process to load an operating system stored in the local storage drive, for example, where the operating system associated with different credentials (e.g., a user's personal credentials versus a user's work credentials).

For purposes of security, an exemplary method can implement a security policy that includes disabling one or more network circuits, prohibiting one or more other network connections or a combination of both. An exemplary method can include locking down one or more ports.

As mentioned, an exemplary method may be implemented in a variety of manners. In various examples, a virtualization layer is relied upon, for example, where executing a hypervisor occurs prior to commencing the boot process or as part of commencing a boot process. As mentioned, a boot process can occur in various manners, for example, by accessing an extended firmware interface (EFI), accessing a BIOS, accessing a system cache, accessing option ROM, accessing a write protected portion of a local storage drive, etc. A boot process may proceed via a combination of one or more of such actions.

With respect to receipt of an operating system via a network connection, as mentioned, the operating system may be in the form of an image. For example, a corporation may create or capture and store images of operating systems used by workers. A corporation may also have specially configured images of an operating system or images of different types of operating systems. Functionality of an operating system may be truncated or otherwise curtailed according to policy or a user's particular choices. An image may be updated based on any of a variety of factors. For example, if a supplier of the operating system issues patches or updates, the corporation may rollout patched or updated images for its users (e.g., via a SAN). As described herein, an image is optionally selected based on specifics about an account, specifics about a network connection, etc.

As described herein, an exemplary apparatus may be a client device configured for connection to a server via a network (e.g., to form a client-server system). Such an apparatus can include one or more processors, volatile memory, a storage drive and circuitry, for example, configured to establish a network connection and to attempt to send credentials via an established network connection. Such an apparatus can include circuitry configured to implement a security policy by isolating at least a portion of a local storage drive, to attempt to send credentials via an established network connection, responsive to authentication failure after an attempt to send credentials, to release the implemented security policy and load an operating system stored on the storage drive, and, responsive to an attempt to send credentials, maintain the implemented security policy and use an operating system exposed via the established network connection and associated with the credentials. In such an apparatus, circuitry configured to load a received operating system can optionally be configured to load an operating system exposed via a network connection into volatile memory. With respect to policy, circuitry to implement a security policy can include circuitry configured to disable a local storage drive (e.g., SSD, HDD, etc.). An exemplary apparatus that includes a removable storage drive can be configured such that operation of the apparatus can occur with the storage drive removed (e.g., with an OS loaded into volatile memory).

As described herein, circuitry to implement a security policy can include circuitry configured to prohibit more than one network connection, circuitry configured to disable one or more network circuits or circuitry configured to prohibit more than one network connection and circuitry configured to disable one or more network circuits.

A particular example for using an exemplary method, an exemplary apparatus or an exemplary system involves a user that has a home computer with a local hard drive that contains on an image of an operating system (e.g., a WINDOWS® OS, a LINUX® OS, an APPLE® OS, etc.). In this example, the user is associated with an organization, for example, a corporation that maintains images of user operating systems on a SAN within a corporate network (e.g., as associated with accounts and optionally other data). When the user switches on his home computer, a boot process commences that involves a boot manager, which may be in BIOS, system cache, etc. In this example, the boot manager executes before any information is accessed from the home computer's local hard drive. Upon display of a GUI, the user enters either work credentials or home credentials. If the user enters home credentials the boot process proceeds by booting the system from the home image of the operating system as stored on the local hard drive. However if the user enters his work credentials, the home computer boots using a network connection and iSCSI protocol that retrieves or receives the corporate image as stored in the corporate network. In such an example, a policy may accompany loading the corporate image where the policy completely disables the local hard drive of the user's home computer to make it impossible for the corporate image to become aware of the drive and get information from the drive or store information to the drive.

As mentioned, virtualization may be used. For example, a virtualization layer may exist that mediates requests from one or more operating systems and underlying hardware. An exemplary method may securely hide a home image of an operating system by using virtualization to hide a portion of the drive associated with the home image or, in another example, by booting in a separate area of the hard drive. Such techniques can reduce or eliminate certain types of legal risks for a corporation, for example, because the corporation can gain no awareness of a user's local content and because the corporation cannot access the home image which is stored on the local drive. As described herein, information to boot from a corporate network can be contained somewhere independently of a home image of an operating system (e.g., information may be part of BIOS, local cache, a protected part of the local hard drive, etc.).

As described herein, various acts, steps, etc., can be implemented as instructions stored in one or more computer-readable media. For example, one or more exemplary computer-readable media can include computer-executable instructions to instruct a computer to implement a security policy; to establish a network connection; to attempt to send credentials via an established network connection; responsive to authentication failure after an attempt to send credentials, to release an implemented security policy and use an operating system stored on the storage drive; and, responsive to an attempt to send credentials, to maintain an implemented security policy and use an operating system exposed via an established network connection, the operating system associated with the credentials.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 8:
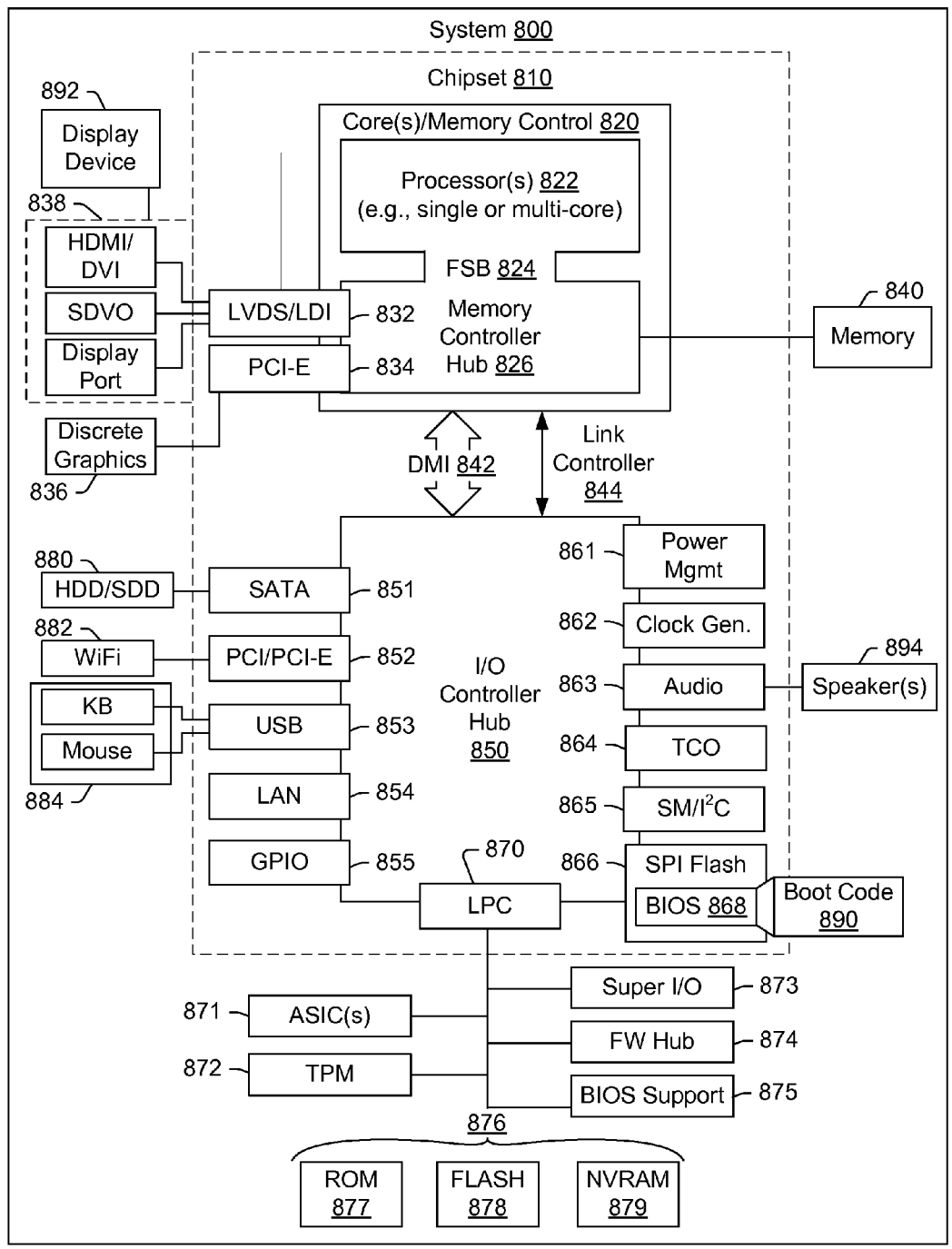
FIG. 8 is a diagram of an exemplary machine, which may be a client device, a server or other apparatus.

While various exemplary circuits or circuitry have been discussed, FIG. 8 depicts a block diagram of an illustrative exemplary computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. An exemplary system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), mice and various other devices (e.g., cameras, phones, storage, media players, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, an exemplary client device or other machine may include fewer or more features than shown in the system 800 of FIG. 8.

CONCLUSION

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. An apparatus comprising:
   one or more processors;
   volatile memory;
   a storage drive; and
   circuitry configured to
     establish a network connection,
     implement a security policy by isolating at least a portion of a local storage drive,
     attempt to send credentials via an established network connection,
     responsive to authentication failure after an attempt to send credentials, release the implemented security policy and load an operating system stored on the local storage drive, and
     responsive to an attempt to send credentials, maintain the implemented security policy and use an operating system exposed via the established network connection and associated with the credentials.

2. The apparatus of claim 1 wherein the circuitry configured to use the operating system exposed via the network connection comprises circuitry configured to load the operating system in the volatile memory.

3. The apparatus of claim 1 wherein the circuitry to implement a security policy comprises circuitry configured to disable the local storage drive.

4. The apparatus of claim 1 wherein the circuitry to implement a security policy comprises circuitry configured to prohibit more than one network connection, circuitry configured to disable one or more network circuits or circuitry configured to prohibit more than one network connection and circuitry configured to disable one or more network circuits.

5. The apparatus of claim 1 wherein the circuitry comprises circuitry configured to execute a hypervisor.

6. The apparatus of claim 1 comprising at least one member selected from a group consisting of an extended firmware interface (EFI), a BIOS, a system cache, option ROM, and a write protected portion of the local storage drive.

7. The apparatus of claim 1 wherein the local storage drive comprises a removable storage drive and wherein the circuitry comprises circuitry for operation of the apparatus with the removable storage drive removed.

8. One or more non-transitory computer-readable storage media comprising computer-executable instructions to instruct a computer to:
   implement a security policy that isolates at least a portion of a local storage drive,
   establish a network connection,
   attempt to send credentials via an established network connection,
   responsive to authentication failure after an attempt to send credentials, release an implemented security policy and use an operating system stored on the local storage drive, and
   responsive to an attempt to send credentials, maintain an implemented security policy and use an operating system exposed via an established network connection, the operating system associated with the credentials.

9. A method comprising:
   commencing a boot process;
   prior to using an operating system,
     implementing a security policy by isolating at least a portion of a local storage drive,
     establishing a network connection,
     sending credentials via the network connection, and
     in response to the sending of the credentials,
       maintaining the security policy and allowing use of an operating system exposed via the network connection and associated with the sent credentials wherein the allowing use of an operating system exposed via the network connection comprises receiving and loading the operating system in local volatile memory, or
       releasing the security policy, allowing use of an operating system stored on the local storage drive; and
   terminating the network connection and powering off the local volatile memory.

10. The method of claim 9 wherein the local storage drive comprises a local hard drive and wherein the isolating comprises disabling the local hard drive.

11. The method of claim 9 wherein the local storage drive comprises a local solid-state drive and wherein the isolating comprises disabling the local solid-state drive.

12. The method of claim 9 wherein the establishing a network connection comprises establishing an iSCSI connection.

13. The method of claim 9 comprising commencing a boot process to load the operating system stored in the local storage drive, the operating system associated with different credentials.

14. The method of claim 9 wherein the implementing the security policy further comprises at least one member from a group consisting of disabling one or more network circuits and prohibiting one or more other network connections.

15. The method of claim 9 wherein the security policy comprises a policy related to information selected from a group consisting of:
   information related to the operating system exposed via the network connection,
   information related to the credentials for establishing the network connection,
   information related to the type of network connection,
   one or more IP addresses of the network connection,
   a time related to the network connection,
   a command received via the network connection, and
   information related to one or more types of hardware exposed via the network connection.

16. The method of claim 9 further comprising executing a hypervisor prior to commencing the boot process.

17. The method of claim 9 wherein the commencing a boot process comprises at least one member selected from a group consisting of accessing an extended firmware interface (EFI), accessing a BIOS, accessing a system cache, accessing option ROM, and accessing a write protected portion of the local storage drive.

18. The method of claim 9 wherein the operating system exposed via the network connection comprises an operating system image.

\* \* \* \* \*